US005431369A

United States Patent [19]

Hung

[11] Patent Number: 5,431,369

[45] Date of Patent: Jul. 11, 1995

[54] HAND/FOOT DUAL OPERATED LEVER MECHANISM FOR HYDRAULIC JACKS

[76] Inventor: Michael Hung, 9-16, Nan Kan Hsia, Nan Kan, Lu Chu Hsiang, Tao Yuan County,

[21] Appl. No.: 253,090

[22] Filed: Jun. 2, 1994

[51] Int. Cl.$^{6}$ .......... B60P 1/48

[52] U.S. Cl. .......... 254/8 B; 254/DIG. 3

[58] Field of Search .......... 74/512, 481, 141.5, 74/519, 560, 523, 524; 60/477, 479; 254/8 B, 93 H, DIG. 3

[56] References Cited

U.S. PATENT DOCUMENTS 4,850,568 7/1989 Hung .

*Primary Examiner*—Robert C. Watson

*Attorney, Agent, or Firm*—Wenderoth, Lind & Ponack

[57] ABSTRACT

A hand/foot dual operated lever mechanism for hydraulic jacks includes a short lever-type foot pedal that can be operated by a movable base of a longer lever and that operates a plunger of a pump. A bolt or shaft extends through the foot pedal and the movable base and a side plate of a hydraulic jack. A hidden spring retracts the foot pedal up so that the plunger of the pump can generate a pumping action to lift lifting arm linkages.

18 Claims, 3 Drawing Sheets

HAND/FOOT DUAL OPERATED LEVER MECHANISM FOR HYDRAULIC JACKS

BACKGROUND OF THE INVENTION a) Field of the Invention

The present invention relates to an improved structure of a hand/foot dual operated lever mechanism for hydraulic jacks, particularly to a lever mechanism in which a spring is hidden and enclosed by a housing and a hand-and-foot operated lever is attached to a foot pedal to provide a dual function lever.

b) Description of the Prior Art

U.S. Pat. No. 4,850,568 discloses a foot pedal structure wherein the two ends of a spring are placed against a foot pedal and a wheel bracket of a hydraulic jack. With such a configuration, it is difficult for the spring to produce resilient force when the foot pedal is pressed. Since the two ends of the spring are exposed to the outside, the spring tends to become disengaged after a period of time. This is particularly true with regard to the end attached to the foot pedal. Therefore, the overall structure is still not quite perfect. It is necessary to improve the practicality of such existing structure. Moreover, the foot pedal in such structure is formed into a flat surface for ease of pedalling. Such flat surface is wide so that it is appropriate only for operation by foot. In some particular cases, the hydraulic jack is placed right underneath a heavy object which makes it difficult to provide space for a foot to operate the hydraulic jack.

SUMMARY OF THE INVENTION

The main object according to the present invention is to provide a dual lever mechanism which can be operated by hand/foot to pressurize or depressurize a hydraulic jack. A foot pedal of the hydraulic jack can be attached to a short rod which can be operated by hand or by foot, thus providing a dual-function hand or foot operated pedal. This is practical for a user to operate the hydraulic jack under different operating environments. In addition, a spring provided for the foot pedal is placed inside an external housing. The spring fits over a circular housing on a bolt and is hidden axially thereof between the external housing and lugs on the foot pedal. One end of the spring extends through and is positioned by the external housing. The other end of the spring is hooked onto a crank pin to assure that the spring is not exposed to the exterior, thus avoiding possible disengagement.

BRIEF DESCRIPTION OF THE DRAWINGS

The drawings disclose an illustrative embodiment of the present invention which serves to exemplify the various advantages and objects hereof, and are as follows.

DETAILED DESCRIPTION OF THE PREFERRED EMBODIMENT

Figure 1:
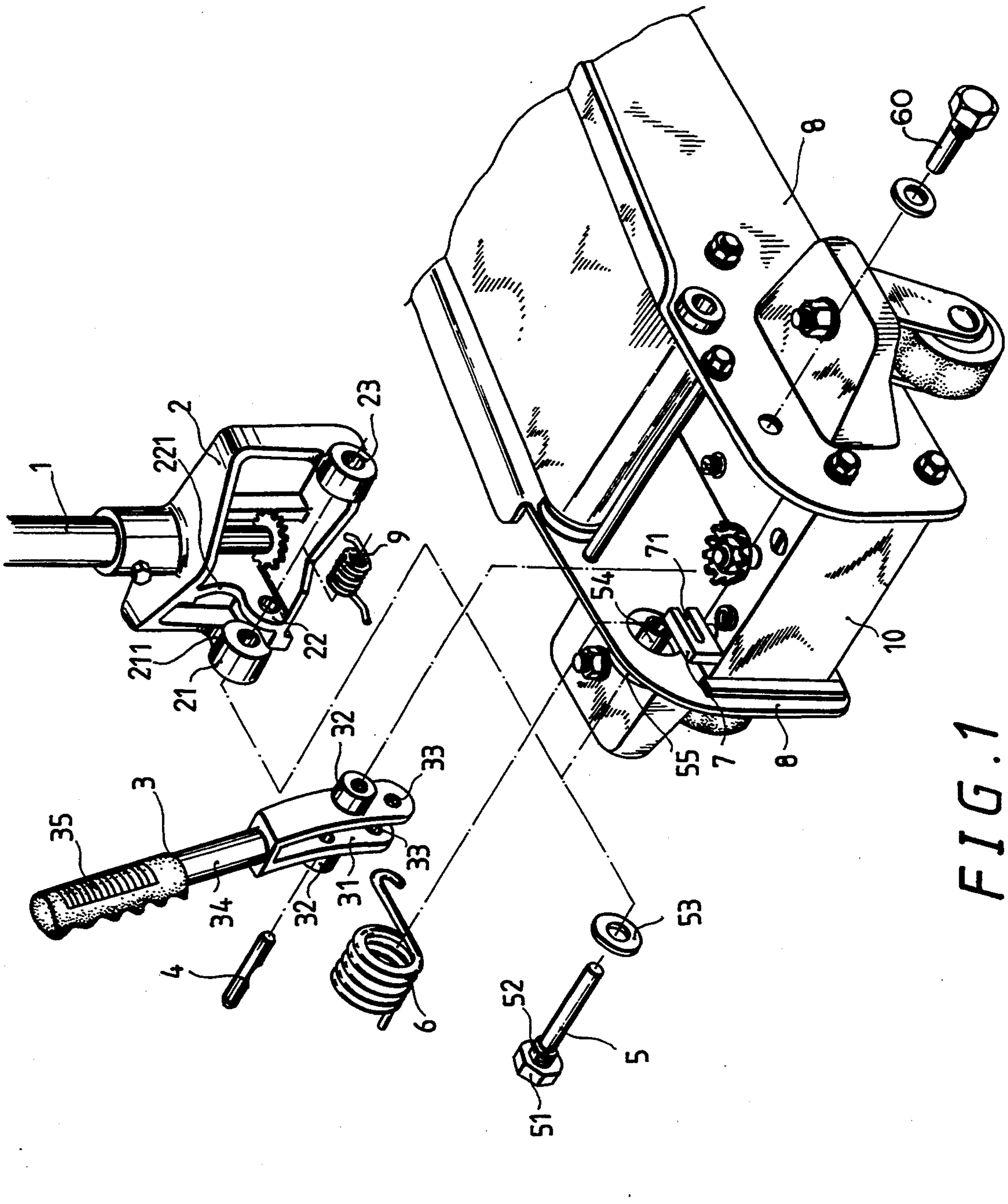
FIG. 1 is a perspective fragmented view of a hydraulic jack having a mechanism according to the present invention.

As can be seen in the accompanying drawings, a hand/foot dual operated lever mechanism for a hydraulic jack includes a hand operated lever 1, a movable base 2, a foot pedal 3, a crank pin 4, a foot pedal pivotal bolt 5 and a spring 6.

The lever 1 is provided on the top of the movable base 2 and is used manually to reciprocate a plunger 7 of a pump so as to pump hydraulic fluid for pressurization. The movable base 2 has extending from a bottom portion thereof three supporting members 21, 22 and 23. Supporting members 21 and 23 cooperate with two side plates 8 of the hydraulic jack, allowing pivotal bolt 5 and a right pivot bolt 60 to secure base 2 in position. In addition, the supporting members 21 and 22 are provided with circular recesses or slots 211 and 221 for accommodating respective lugs provided on the foot pedal 3.

The foot pedal 3, having an appropriate shape of a short lever, is formed into a fork 31 at one end with a suitable length. The fork 31 is made to fit between supporting members 21 and 22, and has lugs 32 used to secure the fork in place. Circular protruded portions of the two lugs 32 cooperate with circular recesses or slots 211 and 221 of the supporting members 21 and 22. In addition, the two sides or legs of fork 31 are provided with respective holes 33. The other end of the foot pedal 3 is extended to form a tubing 34 which may include a grip 35 and thereby be capable of being activated by being grabbed by hand or stepped on by foot.

The crank pin 4 is inserted through and connects center holes of the two lugs 32, so that crank pin 4 can be received in a groove 71 of U-shaped plunger 7 of the pump.

Figure 2:
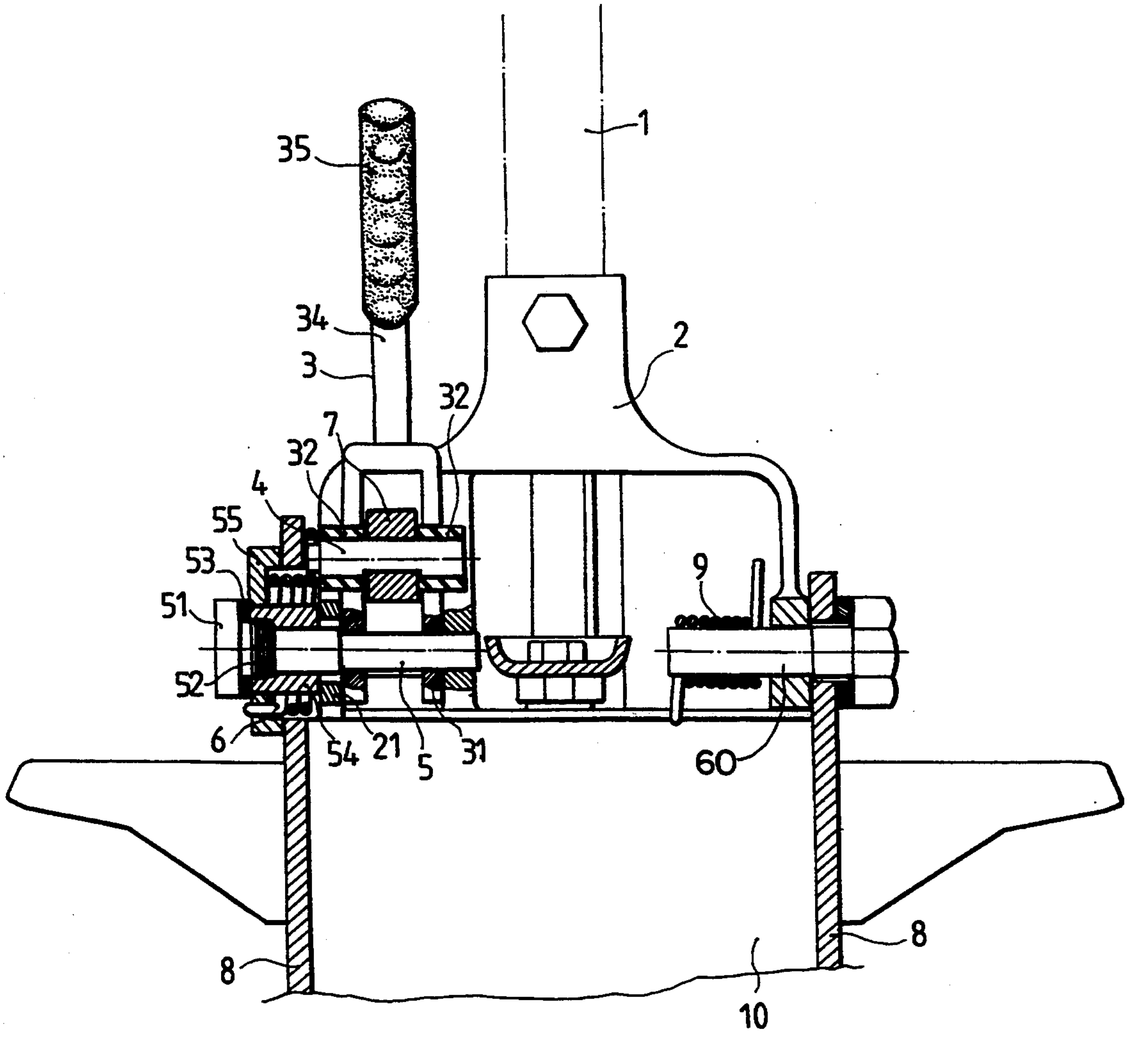
FIG. 2 is a cross-sectional view of an assembly of the hydraulic jack and the mechanism according to the present invention.
Figure 3:
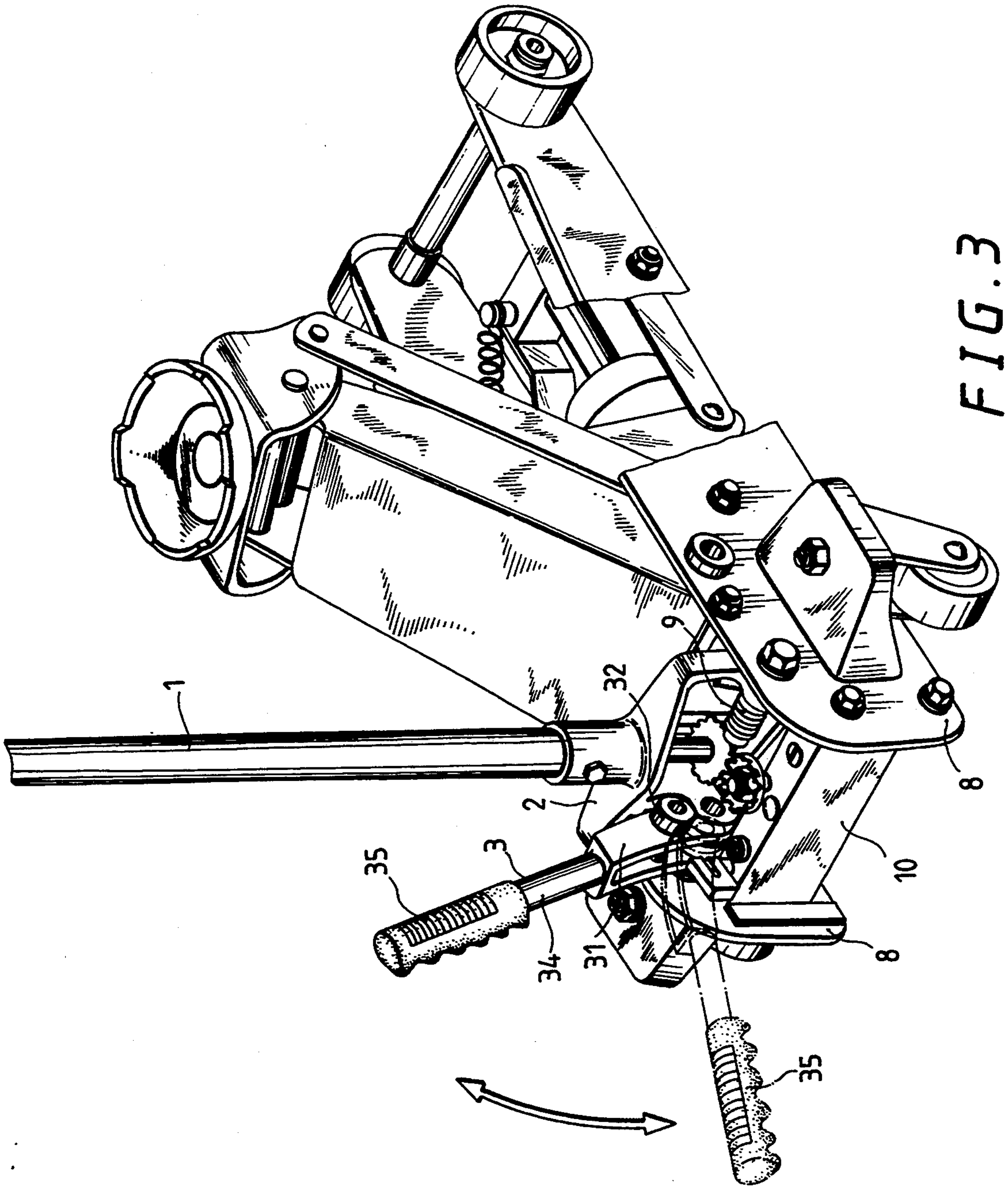
FIG. 3 is a perspective view of the hydraulic jack and mechanism according to the present invention.

The foot pedal pivotal bolt 5 is a shaft and has a cap 51 at an outer end. A center portion of bolt 5 is provided with external threads 52. A washer 53 is first inserted over bolt 5 which is then inserted through a circular housing 54 having internal threads threaded to threads 52. An external housing 55 fits over housing 54. In addition, bolt 5 also is inserted through the supporting members 21 and 22 as well as holes 33 of the foot pedal. However, the spring 6 is placed inside an annular hollow or recess between the circular housing 54 and external housing 55 first. Furthermore, the bolt 5 is used to secure the external housing 55 to the side plate 8 of the hydraulic jack. One end of the spring 6 extends axially through a hole in external housing 55 and positions external housing 55. The other end of spring 6 is hooked onto the crank pin 4, as is shown in FIG. 2.

The above mentioned supporting member 23 located on the opposite side (right side as shown) of the movable base 2 is directly secured with the corresponding side plate 8 of the hydraulic jack by pivot bolt 60. Thus, the movable plate 2 is pivotably connected to the two side plates 8 of the hydraulic jack. A spring 9 is inserted onto the bolt 60. One end of the spring 9 is urging against the top of a base 10 of the hydraulic cylinder, and the other end of spring 9 extends upward and is retained in position against movable base 2. The spring 9 provides the required resilient force during rotation or pivoting of the movable base 2.

In practical use, when the lifting plate of the hydraulic floor jack is not in contact with a load, a user can operate the foot pedal 3 either by hand or by foot. The lifting plate can thus be raised quickly and easily into contact with a load. At such time, the movable base 2 remains in its original or rest position, and it is only the foot pedal 3 that is pivoted. When the lifting plate starts to lift a heavy load, the user then can achieve further lifting by use of lever 1 to conserve energy. Thus, the lifting operation can be conducted step-by-step. Pivoting movement of the movable base 2 due to the force exerted on lever 1 displaces or pivots the foot pedal 3 synchronously. However, the force exerted on the movable base 2 is much greater than the force exerted on the foot pedal. Therefore, the reciprocating movement of the operating lever 1 does not have a negative impact on operation, and the structure definitely provides a mechanism making it possible to save energy quickly.

In the above described configuration, the spring 6 cooperates with the associated components so that it is hidden and not exposed to the exterior. In addition, the foot pedal 3 can be adapted to accept a dual function grip 35 capable of operation by hand or by foot. Pedal 3 thus is convenient and enables flexibility of use, regardless of the operating environment.

Although the invention has been described in its preferred form with a certain degree of particularity, it is to be understood that the present disclosure of such preferred form has been made only by way of example, and numerous changes in the details of construction and the combination and arrangement of parts may be resorted to without departing from the spirit and the scope of the invention as hereinafter claimed. It is intended that the patent shall cover, but suitable expression in the appended claims, whatever features of patentable novelty exists in the invention disclosed.

I claim:

1. In a lever mechanism for a hydraulic jack and including a shaft to be mounted on the jack, a pedal mounted on said shaft for reciprocating pivotal movement thereabout in opposite directions to result in reciprocating movement of a plunger of a pump of the jack, and a spring mounted to bias said pedal to pivot in one said direction about said shaft, the improvement comprising:
   - an inner housing and an external housing positioned about said shaft with an annular recess defined between said inner and external housings;
   - said spring being mounted in said annular recess to surround said inner housing and inwardly of said external housing; and
   - said spring having a first end retained by said external housing and a second end urging said pedal to pivot in said one direction about said shaft.

2. The improvement claimed in claim 1, wherein said shaft has a portion with external threads, and said inner housing has internal threads threaded to said external threads.

3. The improvement claimed in claim 2, wherein said inner housing has a cylindrical exterior surface about which is positioned said spring.

4. The improvement claimed in claim 3, wherein said external housing has therethrough an opening coaxial of said shaft and defined by an inner surface fitting about said cylindrical exterior surface of said inner casing.

5. The improvement claimed in claim 1, wherein said first end of said spring fits into a hole in said external housing.

6. The improvement claimed in claim 5, wherein said pedal supports a crank pin extending parallel to said shaft, and said second end of said spring engages said crank pin.

7. The improvement claimed in claim 1, wherein said pedal supports a crank pin extending parallel to said shaft, and said second end of said spring engages said crank pin.

8. The improvement claimed in claim 1, wherein said shaft has at an outer end thereof a cap extending radially outwardly beyond openings through said inner and external housings.

9. The improvement claimed in claim 1, wherein said pedal has a fork shaped first end fitted about said shaft and a tubular shaped second end.

10. In a hydraulic jack having a lever mechanism including a shaft mounted on said jack, a pedal mounted on said shaft for reciprocating pivotal movement thereabout in opposite directions resulting in reciprocating movement of a plunger of a pump of said jack, and a spring mounted to bias said pedal to pivot in one said direction about said shaft, the improvement comprising:
    - an inner housing and an external housing positioned about said shaft with an annular recess defined between said inner and external housings;
    - said spring being mounted in said annular recess to surround said inner housing and inwardly of said external housing; and
    - said spring having a first end retained by said external housing and a second end urging said pedal to pivot in said one direction about said shaft.

11. The improvement claimed in claim 10, wherein said shaft has a portion with external threads, and said inner housing has internal threads threaded to said external threads.

12. The improvement claimed in claim 11, wherein said inner housing has a cylindrical exterior surface about which is positioned said spring.

13. The improvement claimed in claim 12, wherein said external housing has therethrough an opening coaxial of said shaft and defined by an inner surface fitting about said cylindrical exterior surface of said inner casing.

14. The improvement claimed in claim 10, wherein said first end of said spring fits into a hole in said external housing.

15. The improvement claimed in claim 14, wherein said pedal supports a crank pin extending parallel to said shaft, and said second end of said spring engages said crank pin.

16. The improvement claimed in claim 10, wherein said pedal supports a crank pin extending parallel to said shaft, and said second end of said spring engages said crank pin.

17. The improvement claimed in claim 10, wherein said shaft has at an outer end thereof a cap extending radially outwardly beyond openings through said inner and external housings.

18. The improvement claimed in claim 10, wherein said pedal has a fork shaped first end fitted about said shaft and a tubular shaped second end.

* * * * *